(12) United States Patent
Day (10) Patent No.: US 7,538,966 B2
(45) Date of Patent: May 26, 2009

(54) READ/WRITE HEAD AZIMUTH DETERMINATION VIA SERVO BAND SIGNAL INFORMATION

(75) Inventor: Mark Day, Lake Forest, CA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 11/871,673

(22) Filed: Oct. 12, 2007

(65) Prior Publication Data

US 2009/0097153 A1 Apr. 16, 2009

(51) Int. Cl.
  *G11B 20/20* (2006.01)
  *G11B 21/02* (2006.01)
  *G11B 5/584* (2006.01)

(52) U.S. Cl. .................. 360/76; 360/75; 360/77.12

(58) Field of Classification Search ............ None
See application file for complete search history.

(56) References Cited

U.S. PATENT DOCUMENTS

| 4,254,440 | A  | * | 3/1981  | Martin .................. 360/76 |
| 4,414,587 | A  | * | 11/1983 | Weaver et al. ............ 360/76 |
| 4,506,309 | A  | * | 3/1985  | Joannou et al. ........... 360/137 |
| 6,222,698 | B1 | * | 4/2001  | Barndt et al. ............ 360/76 |
| 6,700,729 | B1 |   | 3/2004  | Beck |
| 6,898,045 | B2 |   | 5/2005  | Beck |
| 2002/0163752 | A1 | * | 11/2002 | Peterson ............... 360/76 |

* cited by examiner

*Primary Examiner*—Andrew L Sniezek
(74) *Attorney, Agent, or Firm*—Baker Botts L.L.P.

(57) ABSTRACT

The present invention, in particular embodiments, provides methods, apparatuses and systems directed to calculating azimuth of a read/write head via signals transduced from a servo read pattern of a tape. The signals are utilized to calculate azimuth of the read/write head which is displayed on a screen. An operator can then utilize the displayed azimuth information to properly adjust the read/write head azimuth.

15 Claims, 8 Drawing Sheets

"PRIOR ART"

FIGURE 1

"PRIOR ART"

"PRIOR ART"

FIGURE 5

"PRIOR ART"

READ/WRITE HEAD AZIMUTH DETERMINATION VIA SERVO BAND SIGNAL INFORMATION

TECHNICAL FIELD

The present disclosure generally relates to tape drives and more specifically to read/write head mechanical adjustment.

BACKGROUND

High-density recording on multiple tracks of a magnetic tape is known. In certain arrangements, parallel tracks extend along the longitudinal length of the magnetic tape. Magnetic tape is moved transversely across a read/write head so that a read and/or write element of the read/write head is moved in proximity to the desired track. During recording or playback, the read/write elements of the read/write head should be aligned with the desired track as the tape moves in a longitudinal direction across the read/write head bump. To increase storage capacities, track density, which is the number of tracks per distance (e.g., inches), has gradually increased. As this track density increases, the track pitch and width decrease. For proper read/write operation, the read/write element of the read/write head should stay at, or very near, the center line of the track. Due to this reduced track pitch, improvements to the head positioner are needed to minimize the offset between the read/write elements of the read/write head and the center line of the track. To that end, servo-based tracking systems employed to allow the tape drive to monitor the head-to-track relationship. If the drive determines that the head and track are offset, then the head positioner corrects the relative position to maintain the relationship between the read/write head and the center line of the track.

Closed loop positioners are often used in tape systems having higher track densities. In high-density tape systems, the tape may wander in the lateral direction as it moves in the longitudinal direction, which results in an offset between the read/write head and the track center line. To avoid these types of problems, tape cartridges for high-density tape drives are preformatted with information often called servo information, which is used to maintain the correct lateral position of the tape with respect to the read/write head. Servo information provides the system with feedback to determine the continuous position of the tape relative to the read/write head. Analysis of the servo signals allows for a determination of an offset and the distance of the offset between the expected track location and the actual read/write head position. Based on the information, the read/write head is moved by a positioner to the center line of the track so that write/read operations can occur properly. Closed loop positioners generally use fine positioners to move the read/write head during a write/read operation. These fine positioners are used to maintain the position of the read/write head at the center line of the track under a closed loop servo control using the preformatted servo information on the tape.

The tracking servo system employed by linear tape drives, such as the Linear Tape Open ("LTO") family, is an example of a servo-based, closed loop control mechanism that allows for increased track density. Track density is one of the parameters, besides bit density, that allows storage capacity to increase. The tracking servo system requires feedback to indicate the relative position of the tape and the recording head elements. One of the methods employed in linear tape drives using such feedback signals is to pre-record a series of magnetic stripes that contain position feedback information, which is a timing-based signal. When the stripes are recorded with predetermined azimuth angles, the signals from the read/write head can be processed to decode the lateral position information regarding the relative position of the read/write head and the tape.

The increasing track density typically requires improvements in tape drive manufacture specifications. Two of these specifications include zenith (x-axis) and azimuth (y-axis tilt) of the read/write head. If the zenith and/or the azimuth is not properly calibrated, accuracy of transducing data on a tape decreases.

One prior art approach for calibrating the zenith and azimuth is an optical alignment system that utilizes a camera to digitize points of the read/write head in order to determine the zenith and azimuth. Once those values are known, the optical alignment system further manipulates screws, if necessary, to calibrate the zenith and azimuth. However, optical alignment systems are typically very expensive. Additionally, they are typically not robust enough to accurately calibrate read/write heads of next-generation technologies.

SUMMARY

The present invention, in particular embodiments, provides methods, apparatuses and systems directed to calculating azimuth of a read/write head via signals transduced from a servo read pattern of a tape. The signals are utilized to calculate azimuth of the read/write head which is displayed on a screen. An operator can then utilize the displayed azimuth information to properly adjust the read/write head azimuth.

The following embodiments and aspects thereof are described and illustrated in conjunction with systems, apparatuses and methods which are meant to be exemplary and illustrative, not limiting in scope. In various embodiments, one or more of the above-described problems have been reduced or eliminated. In addition to the aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be illustrative, not limiting in scope.

Figure 1:
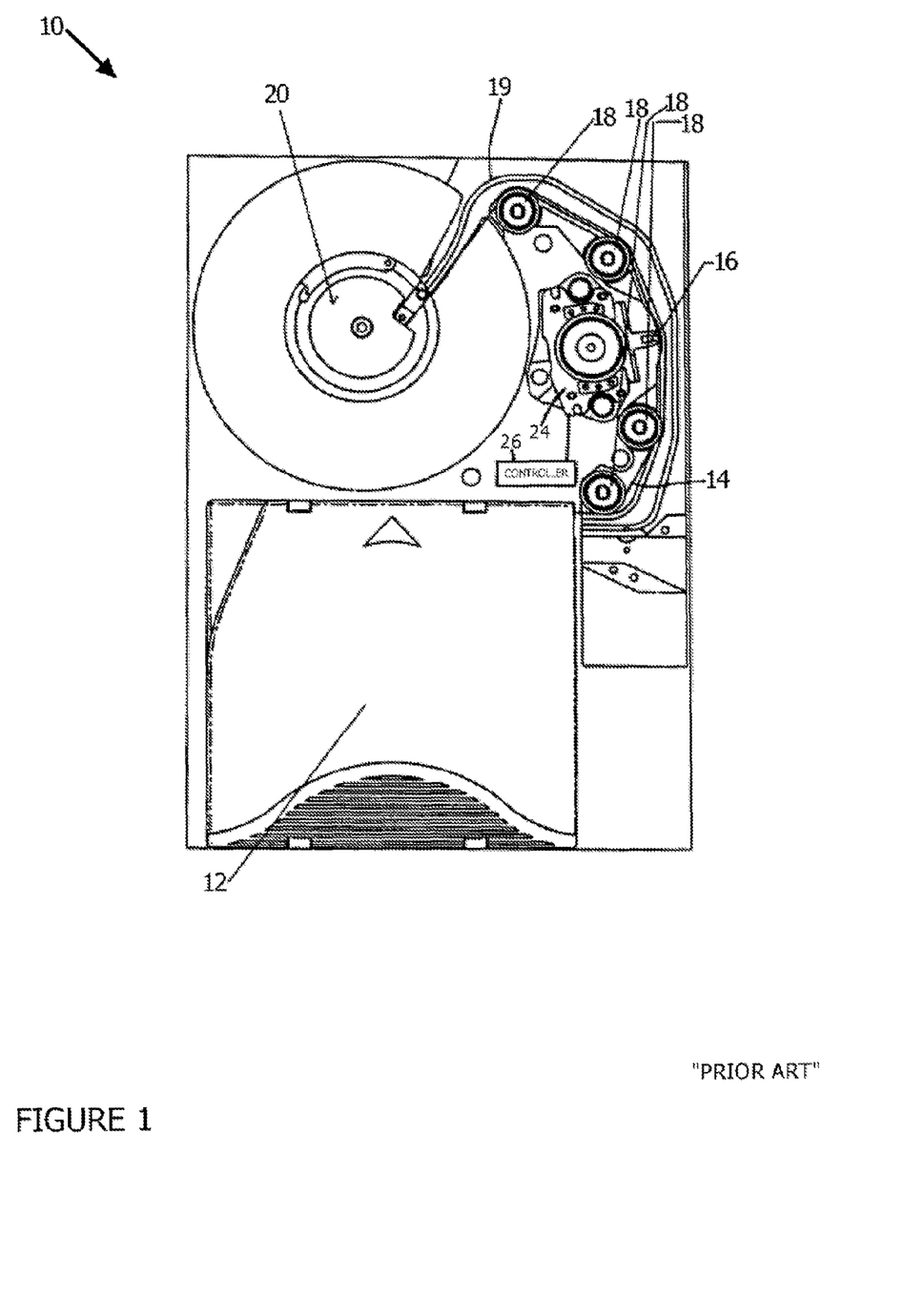
FIG. 1 is a perspective view of an LTO-type magnetic tape cartridge drive as viewed from an upper side thereof.

FIG. 1 shows an example embodiment of a tape drive 10 utilizing the claimed embodiments. The claimed embodiments may also be used with other types of tape drives, but the claimed embodiments are being described with respect to the drive of FIG. 1 for purposes of explanation. The figure shows the tape drive 10 in a normal plan view. Tape cartridge 12 is inserted into the tape drive 10. Tape 14 is depicted as threaded into the take-up hub assembly 20. Tape 14 is guided by tape guides 18 past the magnetic head 16. A guide track 19 is used to guide a tape leader between the tape cartridge 12 and the take-up hub assembly 20. A head positioning mechanism is schematically indicated as block 24 and coupled to the magnetic head 16. In response to control signals from a controller 26, the head positioning mechanism 24 adjusts the position of the magnetic head 16. The controller 26 generates these control signals in response to the detected servo stripes pre-recorded on the tape 14.

Figure 2:
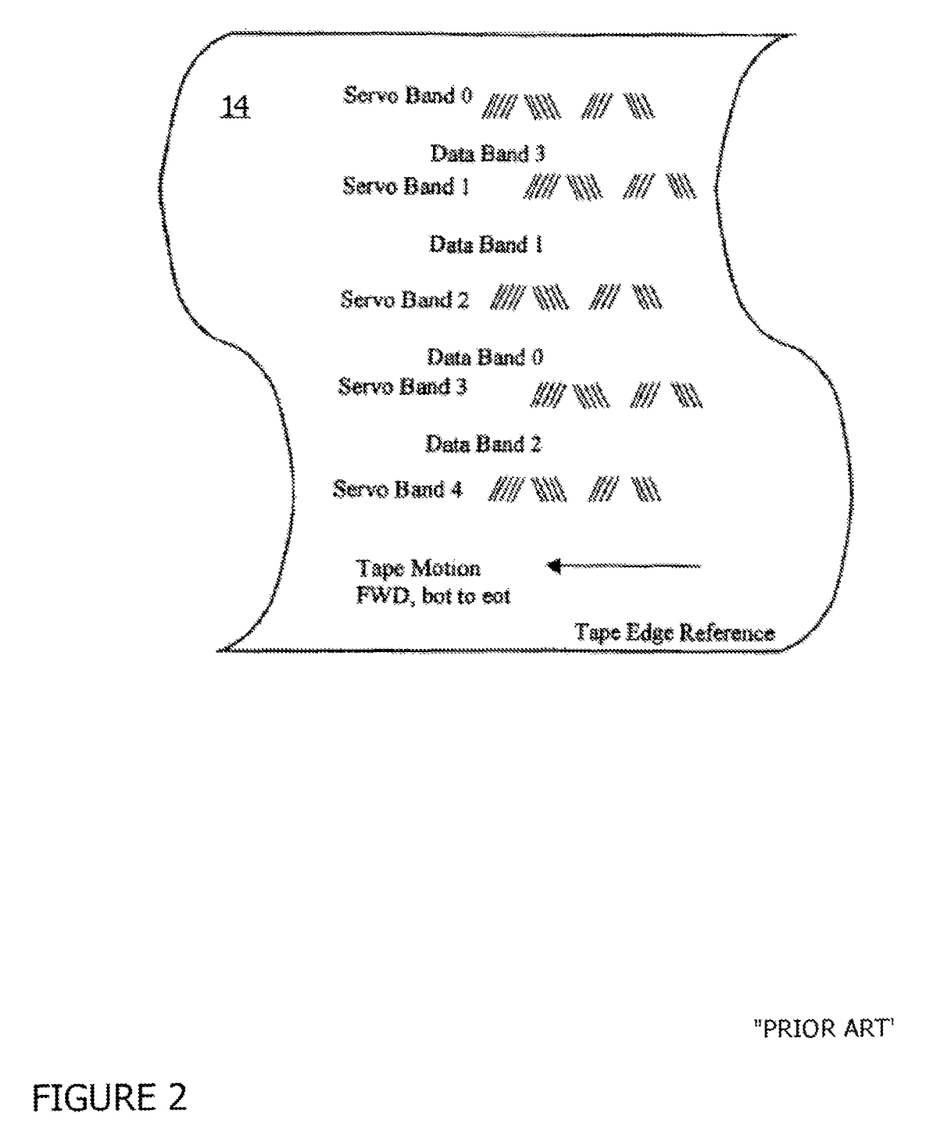
FIG. 2 illustrates how LTO servo bands and data bands may be written on magnetic tape.

Referring to FIG. 2, an example LTO PES servo format is schematically depicted. There are five servo bands, 0-4, laterally spaced apart from one another. In between the servo bands are four data bands, 0-3. In the LTO format, the PES feedback is defined as the timing based servo system. The timing pulse is generated by the detection of the servo stripes and is decoded into ratios whereby the tracking algorithm formulates the PES. The labeling "bot" and "eot" on FIG. 2 refers to "beginning of tape" and "end of tape," respectively. Of course, the servo bands can be arranged in other configurations relative to the data tracks or bands.

Figure 3:
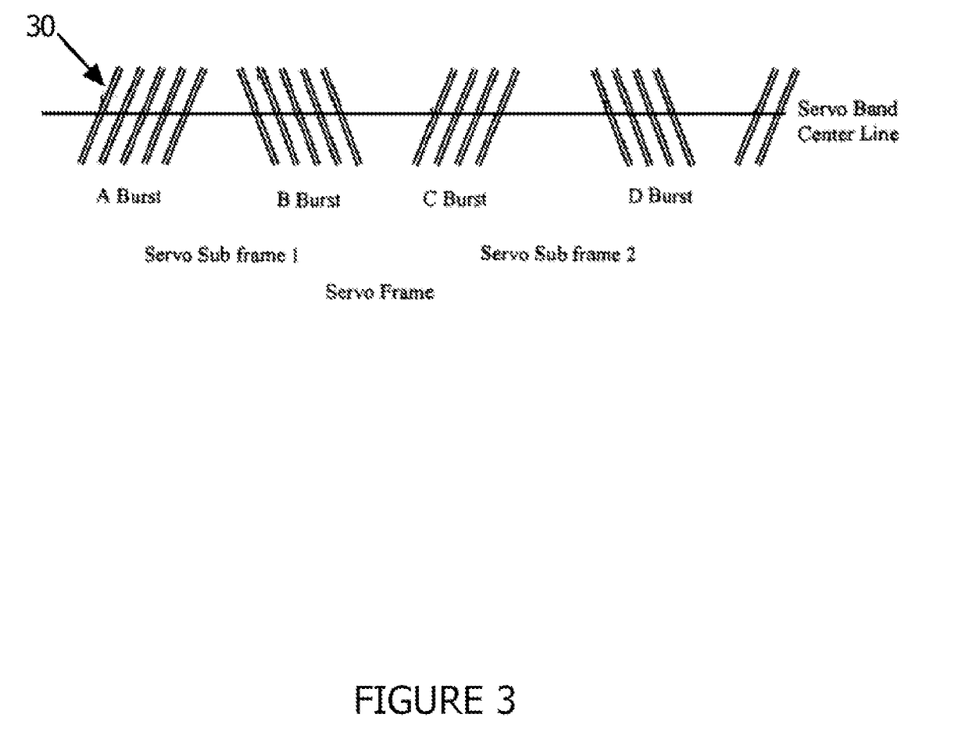
FIG. 3 illustrates an LTO servo band.

Referring also now to FIG. 3, a servo stripe 30 comprises two magnetic transitions that are typically spaced 2.1 microns apart. As depicted in FIG. 3, the servo stripes 30 are arranged in groups, referred to as servo bursts. There are four distinct types of servo bursts, A, B, C, and D. The A and B bursts both consist of five stripes, while the C and D bursts are four stripes each. The relative spacing of these stripes within each group provides encoded linear tape position information (LPOS).

Figure 4:
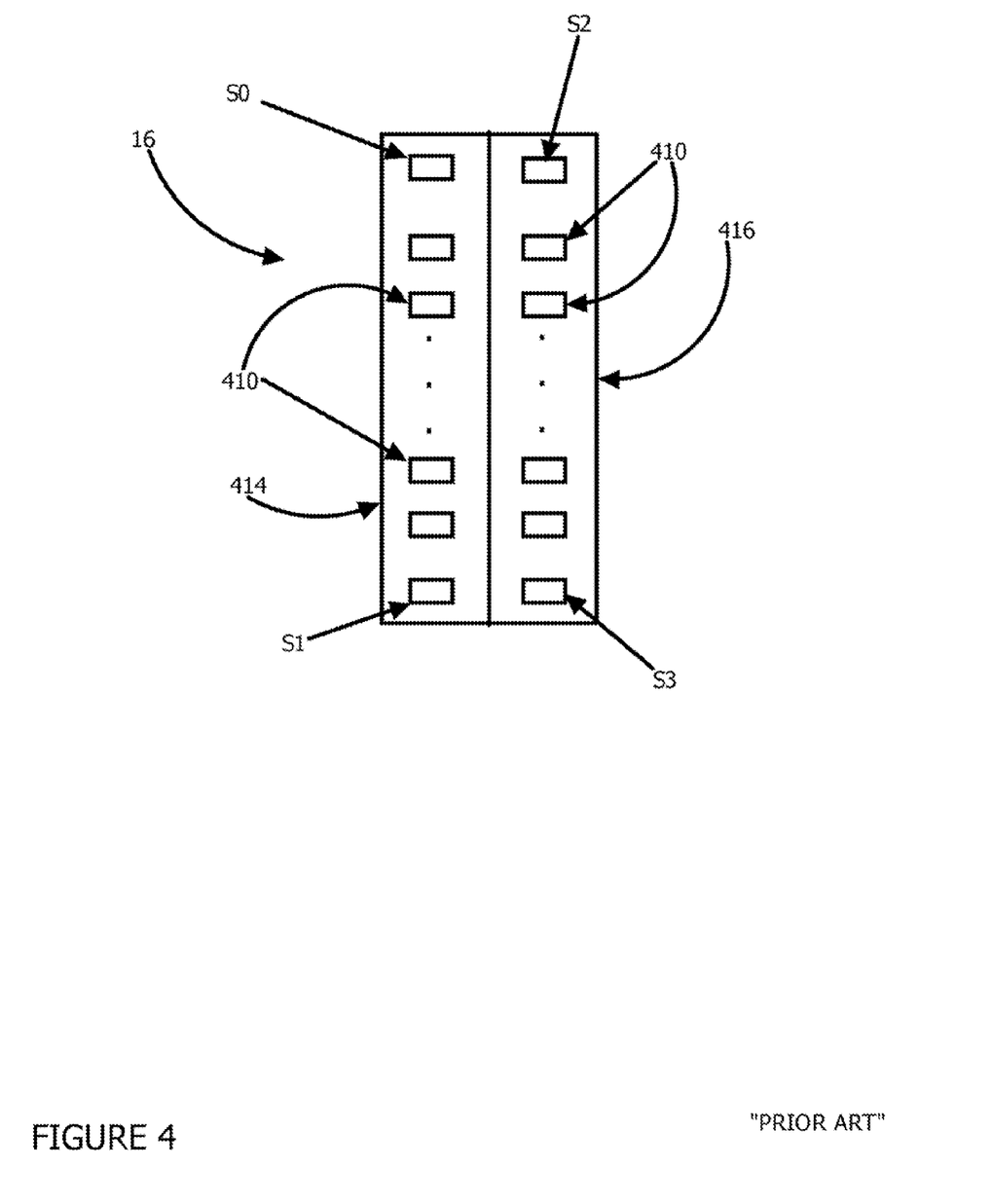
FIG. 4 is a block diagram illustrating a dual-bump read/write head.

FIG. 4 is a block diagram illustrating a read/write head 16. Included are servo read elements (S0, S2, S1, S3) and various read elements (410) on two bumps 414, 416. During operation, servo read elements S0 and S1 are utilized for servo control as a tape is being wound from a cartridge 12 into a tape drive 10 and servo read elements S2 and S3 are typically utilized when a tape is being wound back into a cartridge 12 from a tape drive 10.

Figure 5:
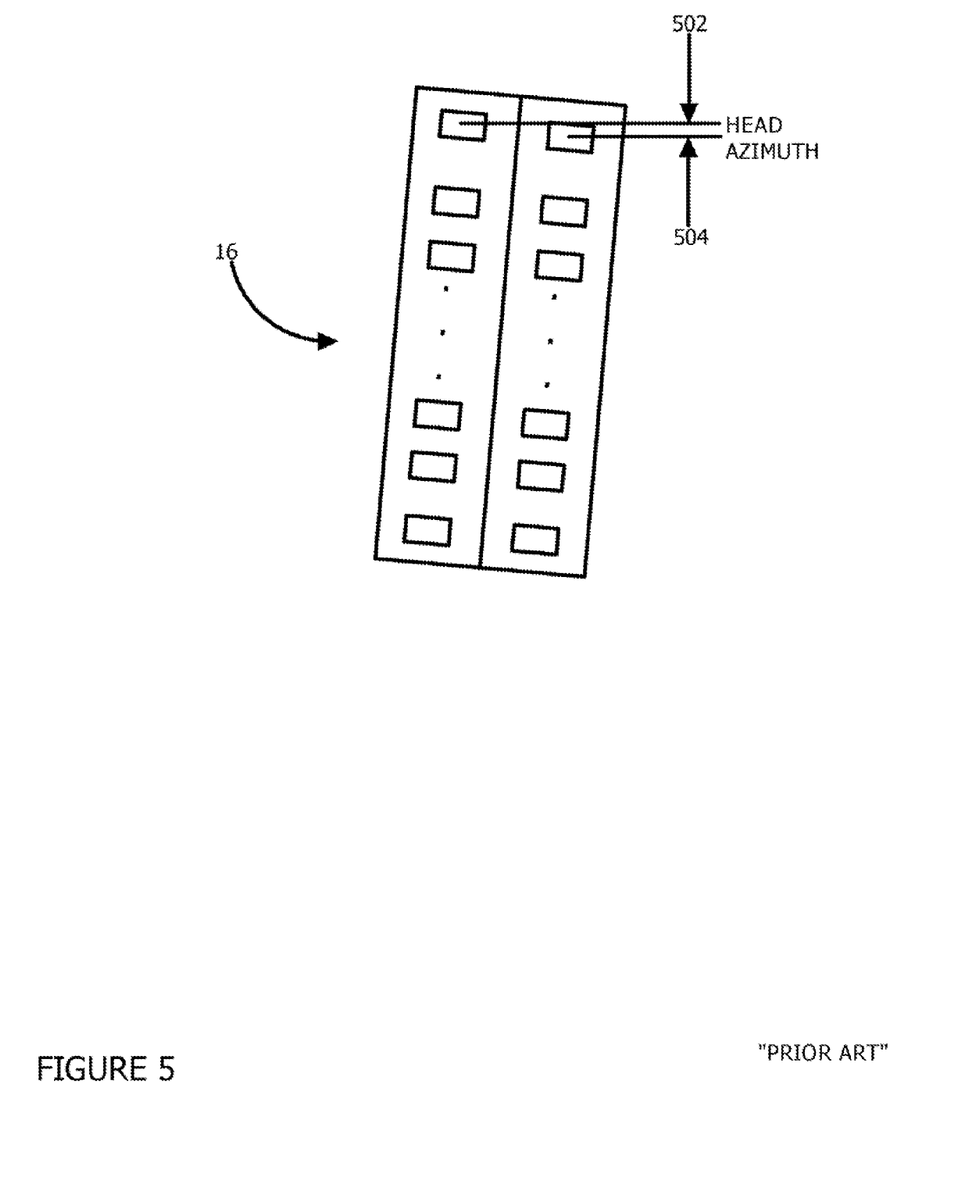
FIG. 5 is a block diagram illustrating read/write head azimuth.

FIG. 5 is a block diagram illustrating read/write head azimuth. During manufacture of a tape drive, the read/write head 16 is positioned at a nominal position with the intent that a more precise calibration will later be performed. FIG. 5 demonstrates a potential situation wherein the read/write head 16 is not optimally aligned. Specifically, a distance, between lines 502 and 504, demonstrates an example azimuth of the read/write head 16. Ideally, after the read/write head 16 is calibrated, the distance is minimized.

In accordance with an example embodiment, azimuth calibration of the read/write head 16 is performed while a cartridge, such as cartridge 12, is loaded into a tape drive, such as tape drive 10, and tape 14 is moving past the read/write head 16. More specifically, the tape drive 10 can be connected to a host computer system, for example during manufacture of the tape drive 10, as tape 14 is moving past the read/write head 16, the read/write head 16 can transduce signals from the servo stripe 30 of the tape 14. In one embodiment, servo read elements S0 and S2 are utilized to transduce signals from the servo stripe 30 as the tape 14 is wound from the cartridge 12 to the drive 10. In another embodiment, servo read elements S1 and S3 are utilized to transduce signals from the servo stripe 30 as the tape 14 is wound from the drive 10 to the cartridge. However, the claimed embodiments are not limited in such a fashion. Restated, either pairing of servo read elements (S0 and S2 or S1 and S3) can be utilized to transduce signals from the tape 14 in either direction of tape travel.

As the tape 14 is traveling past the read/write head 16, transduced signals, from either pairing of the servo read elements (S0 and S2 or S1 and S3), are fed to the host computer system which calculates the azimuth of the read/write head 16 that is typically displayed on a computer screen. An operator calibrating the azimuth of the read/write head 16 can then typically adjust one or more screws, associated with the read/write head 16, to minimize the azimuth. As the screw(s) are being adjusted, the calculated azimuth that is displayed on the computer screen changes accordingly, thus allowing the operator to adjust the azimuth until it is optimally calibrated. In one implementation, the azimuth is graphically displayed relative to a target azimuth and is utilized as an aide for adjusting the azimuth. In one implementation, the displayed azimuth is a running-average of instantaneous azimuth values.

The electronic servo signals are monitored by a Servo System ASIC, which can be programmed by control firmware to select which heads to monitor for servo information, and firmware normally selects the proper head configurations as described for forward and reverse directions. As indicated above, a different configuration, via selection of servo read elements, can be programmed for adjusting the tape head azimuth position dynamically and electronically by use of a specialized program, which is described below. One configuration for measuring the azimuth is to use both top servo read elements S0 and S2. The servo read elements are designed to work with the Servo System ASIC to process the servo signal and determine a ratio value between servo bursts of servo data prerecorded at different angles on the LTO tape cartridge media. The ratio value is typically between 0.3 and 0.7, and this ratio can be converted to a measurement in microns, using the following equation:

$$Mo = r*475.718 \quad \text{(Equation I)}$$

Where "Mo" is a calculated head position offset and "r" is a transduced servo signal ratio. Mo values from the top servo heads (S0, S2) are then used to determine head azimuth "Ha":

$$Ha = Mo0 - Mo1 \quad \text{(Equation II)}$$

Where "Ha" is the head azimuth in microns, and Mo0 is the head Offset Measurement Mo value for head S0, and Mo1 is the Mo for head S2.

Figure 6:
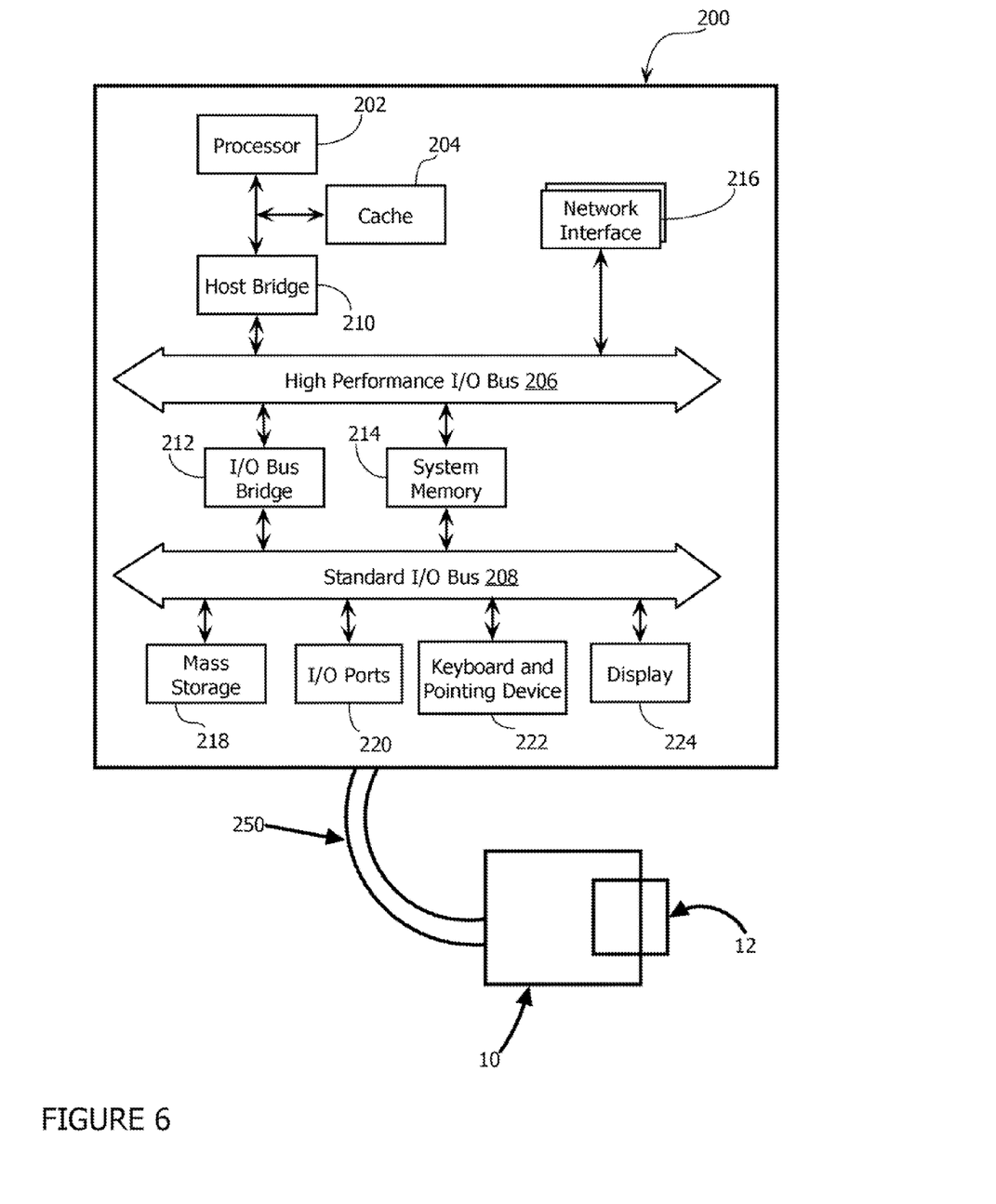
FIG. 6 is a block diagram illustrating a calibration station for adjusting read/write head azimuth, in accordance with an example embodiment.

FIG. 6 is a block diagram illustrating a calibration station for adjusting read/write head azimuth, in accordance with an example embodiment. For example, host computer system 200 can be connected to the tape drive 10 that has an inserted cartridge 12. For simplicity, the tape drive 12 and the cartridge 12 are both presented, in FIG. 6, as block-representations.

Typically system 200 can be plugged into a tape drive 10 and be utilized to issue commands to a the tape drive's 10 firmware and related APIs to load a cartridge and access transduced signals of the selected servo read elements (S0, S2 or S1, S3). The commands are typically issued from system 200 to the tape drive 10 via a connection 250. In one implementation, the connection 250 utilizes the Recommended Standard 232 (RS-232) standard for binary data signals between a data terminal equipment (DTE) and a data circuit-terminating equipment (DCE). Other standards and communications protocols can be used.

In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218 and I/O ports 220 couple to bus 208. The I/O port 220 can be an RS-232 port that can accommodate the RS-232 standard mentioned in the previous section. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described herein may be implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Linux operating system. However, the present invention may be used with other suitable operating systems, such as the Windows® 95/98/NT/XP/Vista operating system, available from Microsoft Corporation of Redmond, Wash., the Apple Macintosh Operating System, available from Apple Computer Inc. of Cupertino, Calif., UNIX operating systems, and the like.

Figure 7:
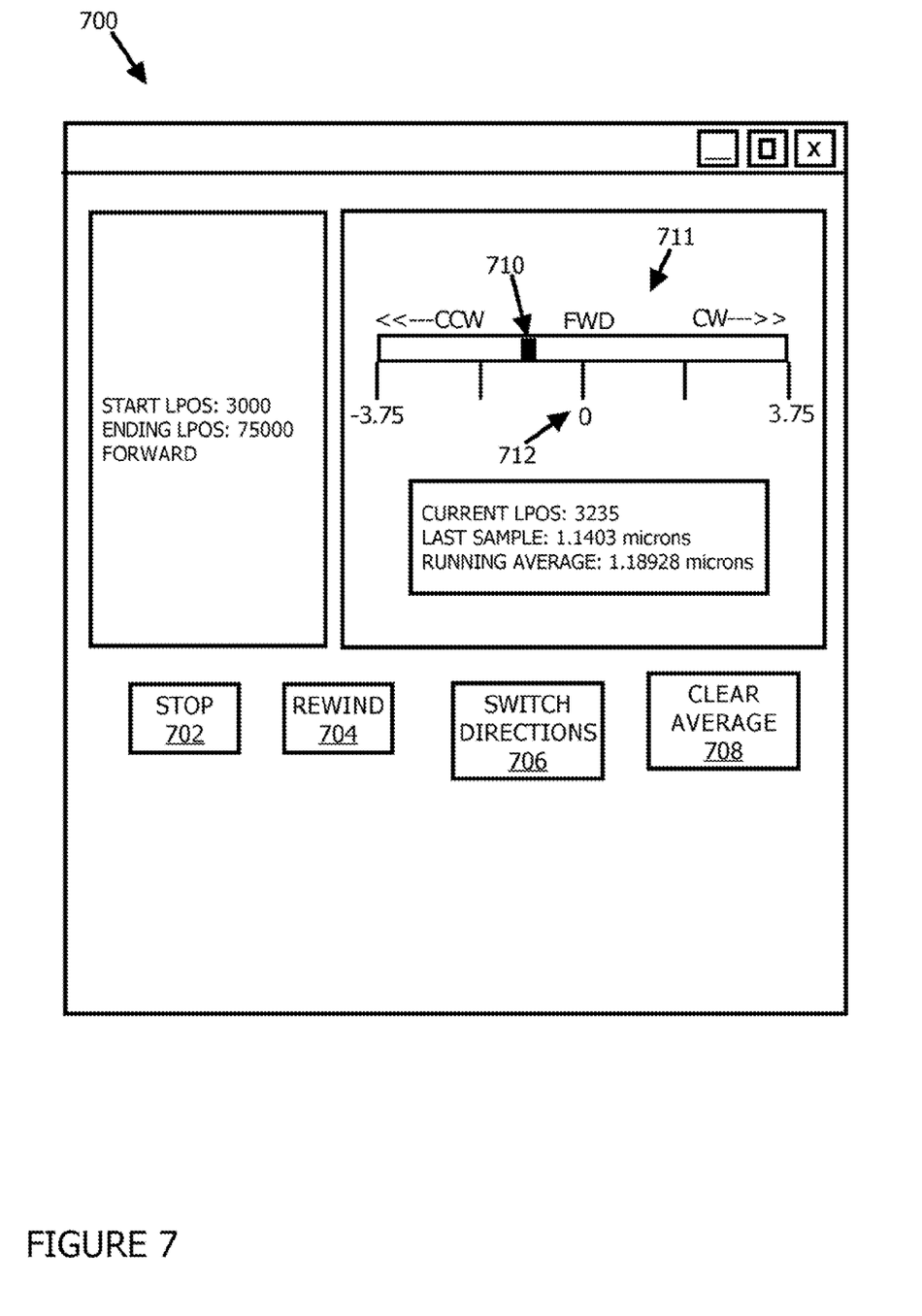
FIG. 7 is a diagram illustrating a screenshot of an example interface that can be used in connection with an example embodiment.

FIG. 7 is a diagram illustrating a screenshot 700 of an example interface that can be used to in connection with an example embodiment. Screenshot 700 includes various icons to have system 200 issue commands to the tape drive 10 such as stop (702) winding of tape 14, rewind 704 tape 14, switch tape direction 706 and clear a running average (708) of the azimuth. Additionally, screenshot 700 includes an azimuth status indicator 710, on meter 711, that moves as an operator adjusts azimuth screw(s) of the read/write head 16. As the operator adjusts the azimuth screw(s), the azimuth status indicator 710 allows the operator to view the azimuth position, relative to a target azimuth value 712, such that the azimuth can be easily adjusted based on the displayed azimuth position and the target azimuth value 712. Typically, the displayed azimuth position is a running average of calculated azimuth values which may be cleared as necessary such as before a new calibration cycle, for example.

Figure 8:
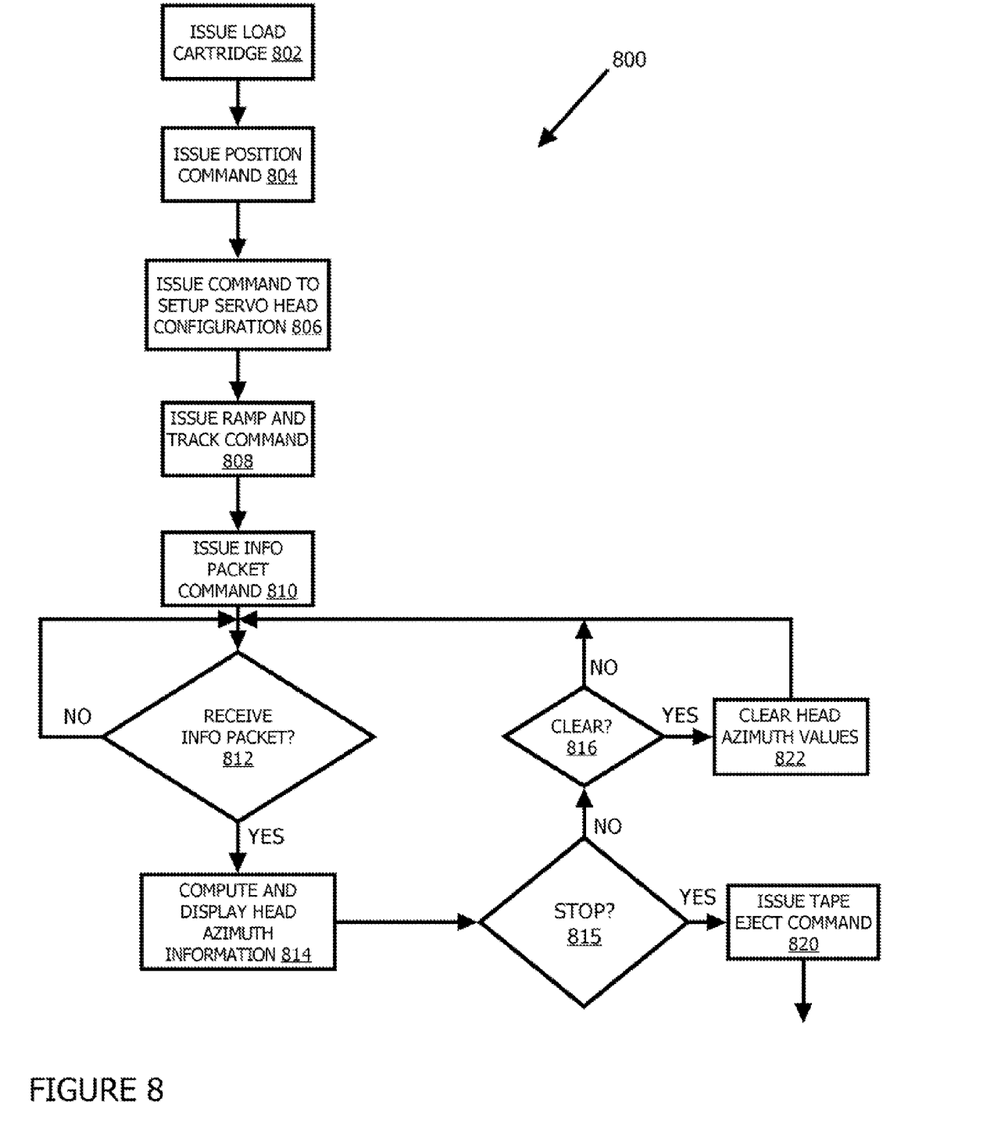
FIG. 8 is a flowchart diagram illustrating a method for calibrating read/write head azimuth, in accordance with an example embodiment.

FIG. 8 is a flowchart diagram illustrating a method 800 for calibrating read/write head azimuth, in accordance with an example embodiment. Specifically, the processor 202 of host computer system 200 issues (802) a load cartridge command to the tape drive 10 and further transmits an issue position command 804. Next, the processor 202 issues a command to set up servo head signals (806) and further directs the tape drive 10 to perform ramp and track commands (808). Next, the processor 202 issues an information packet command (810) to obtain transduced servo read signals. When packets are received, the processor 202 computes and displays the azimuth (814) which an operator may utilize while turning an azimuth adjust screw to calibrate the azimuth. If further calibration is not desired (815), the processor 202 issues a tape eject command (820). If additional calibration is to be performed (815), the processor 202 determines if the operator has selected a clear command (816), to clear the running average azimuth value. If yes, the processor 202 clears the azimuth values (822). Typically, clearing the running average is done to remove values based on a previous adjustment. The processor then waits for additional info packets at operation 812.

Advantageously, the present invention obviates or reduces a need to use expensive prior art optical alignment equipment for azimuth calibration. Additionally, the present invention is capable of adjusting azimuth with increased precision as compared to prior art tools such as optical alignment equipment.

While a number of exemplary aspects and embodiments have been discussed above, those of skill in the art will recognize certain modifications, permutations, additions and sub-combinations thereof. For example, the processes for obtaining azimuth can be incorporated into the tape drive firmware and used in a diagnostic process to obtain and report azimuth values for a full or partial tape run. The resulting azimuth values can be used to diagnose potential problems with the tape drive. It should also be noted that the following appended claims and claims hereafter introduced are interpreted to include all such modifications, permutations, additions and sub-combinations as are within their true spirit and scope.

What is claimed is:

1. A method for calibrating read/write head azimuth of a read/write head of a tape drive comprising:
commanding a tape drive to move a tape including a servo band across a read/write head;
receiving, while the tape is moving across the read/write head, position signals transduced from the tape by first and second servo read elements of the tape drive, on a read/write head, substantially aligned relative to a tape path of the tape;
calculating azimuth of the read/write head relative to the tape path based on the received position signals; and
displaying the calculated azimuth on a display, wherein the displayed azimuth is a running average of instantaneous azimuth values and wherein the displayed azimuth is depicted on a displayed meter.

2. The method as recited in claim 1 wherein the calculated azimuth is graphically displayed relative to a target azimuth.

3. The method as recited in claim 1 further comprising adjusting the azimuth of the read/write head based on the displayed azimuth value.

4. The method as recited in claim 1 wherein the first and second servo read elements are located at a first axial-end of the read/write head.

5. The method as recited in claim 4 wherein the first and second servo read elements are located at a second axial-end of the read/write head opposite the first axial-end.

6. A method for calibrating read/write head azimuth of a read/write head of a tape drive comprising:
commanding a tape drive to move a tape including a servo band across a read/write head;
receiving, while the tape is moving across the read/write head, position signals transduced from the tape by first and second servo read elements of the tape drive, on a read/write head, substantially aligned relative to a tape path of the tape, wherein the first servo read element is located on a first bump of the read/write head and the second servo read element is located on a second bump of the read/writ head;
calculating azimuth of the read/write head relative to the tape path based on the received position signals, wherein the azimuth is a difference of a head position offset between the first and second bumps; and
displaying the calculated azimuth on a display, wherein the head position offset is a product of a servo ratio and a constant, wherein the servo ratio is determined by detecting the timing between servo bursts generated when the read/write head passes over servo frames of the tape, and wherein each servo frames comprises two or more angularly-offset sets of servo stripes.

7. The method as recited in claim 6 wherein the constant is about 475 microns.

8. A computer-readable medium storing executable instructions to determining read/write head azimuth of a tape drive, the executable instructions which, when executed, is operable to cause one or more processors to:
command a tape drive to move a tape including a servo band across a read/write head;
receive, while the tape is moving across the read/write head, position signals transduced from the tape by first and second servo read elements of the tape drive, on a read/write head, substantially aligned relative to a tape path of the tape;
calculate azimuth of the read/write head relative to the tape path based on the received position signals; and
display the calculated azimuth on a display, wherein the displayed azimuth is a running average of instantaneous azimuth values and wherein the displayed azimuth is depicted on a displayed meter.

9. The computer-readable medium as recited in claim 8 wherein the first servo read element is located on a first bump of the read/write head and the second servo read element is located on a second bump of the read/write head.

10. The computer-readable medium as recited in claim 9 wherein the azimuth is a difference of a head position offset between the first and second bumps.

11. The computer-readable medium as recited in claim 8 wherein the first and second servo read elements are located at a first axial-end of the read/write head.

12. The computer-readable medium as recited in claim 11 wherein the first and second servo read elements are located at a second axial-end of the read/write head opposite the first axial-end.

13. A computer-readable medium storing executable instructions to determining read/write head azimuth of a tape drive, the executable instructions which, when executed, is operable to cause one or more processors to:
command a tape drive to move a tape including a servo band across a read/write head;
receive, while the tape is moving across the read/write head, position signals transduced from the tape by first and second servo read elements of the tape drive, on a read/write head, substantially aligned relative to a tape path of the tape;
calculate azimuth of the read/write head relative to the tape path based on the received position signals; and
display the calculated azimuth on a display, wherein the head position offset is a product of a servo ratio and a constant, wherein the servo ratio is determined by detecting the timing between servo bursts generated when the read/write head passes over servo frames of the tape, and wherein each servo frames comprises two or more angularly-offset sets of servo stripes.

14. The computer-readable medium as recited in claim 13 wherein the constant is about 475 microns.

15. A method for manufacturing a tape drive having a calibrated read/write head azimuth comprising:
assembling a tape drive comprising a read/write head and an azimuth adjustment mechanism operative to adjust the azimuth angle of the read/write head;
commanding the tape drive to move a tape including a servo band across the read/write head;
receiving, while the tape is moving across the read/write head, position signals transduced from the tape by first and second servo read elements of the read/write head, on a read/write head, substantially aligned relative to a tape path of the tape;
calculating azimuth of the read/write head relative to the tape path based on the received position signals;
displaying the calculated azimuth on a display, wherein the displayed azimuth is a running average of instantaneous azimuth values and wherein the displayed azimuth is depicted on a displayed meter; and
adjusting the azimuth of the read/write head based on the displayed azimuth value.

* * * * *